(12) United States Patent
Sinha

(10) Patent No.: US 8,055,645 B1
(45) Date of Patent: Nov. 8, 2011

(54) HIERARCHICAL INDEX FOR ENHANCED STORAGE OF FILE CHANGES

(75) Inventor: Dinesh Sinha, North Brunswick, NJ (US)

(73) Assignee: Packeteer, Inc., Cupertino, CA (US)

( * ) Notice: Subject to any disclaimer, the term of this patent is extended or adjusted under 35 U.S.C. 154(b) by 824 days.

(21) Appl. No.: 11/611,313

(22) Filed: Dec. 15, 2006

(51) Int. Cl.
*G06F 7/00* (2006.01)
*G06F 17/30* (2006.01)

(52) U.S. Cl. ........................ 707/711; 707/626
(58) Field of Classification Search .......... 707/100–101, 707/609, 711
See application file for complete search history.

(56) References Cited

U.S. PATENT DOCUMENTS

| | | | |
|---|---|---|---|
| 5,758,356 A * | 5/1998 | Hara et al. | 707/683 |
| 6,175,835 B1 * | 1/2001 | Shadmon | 707/696 |
| 6,470,344 B1 * | 10/2002 | Kothuri et al. | 707/100 |
| 6,546,384 B2 * | 4/2003 | Shaath et al. | 1/1 |
| 6,847,983 B2 | 1/2005 | Somalwar | |
| 6,859,455 B1 * | 2/2005 | Yazdani et al. | 370/392 |
| 6,985,915 B2 | 1/2006 | Somalwar | |
| 7,237,192 B1 * | 6/2007 | Stephenson et al. | 715/210 |
| 2002/0188405 A1 * | 12/2002 | Luo et al. | 702/14 |
| 2004/0193803 A1 * | 9/2004 | Mogi et al. | 711/129 |

* cited by examiner

*Primary Examiner* — Etienne Leroux
*Assistant Examiner* — Mohammad Rahman
(74) *Attorney, Agent, or Firm* — Baker Botts L.L.P.

(57) ABSTRACT

The claimed embodiments provide methods, apparatuses and systems directed to storing write records in a hierarchical index which includes a root node with one or more stem nodes, each corresponding to respective data ranges of a data file. Write records are attached to the hierarchical index as leaf nodes with a possibility of being split into two or more leaf nodes if a write record traverses multiple data ranges. Additionally, the hierarchical index can conditionally grow based on a number of leaf nodes attached to a given stem node in the hierarchical index.

36 Claims, 13 Drawing Sheets

HIERARCHICAL INDEX FOR ENHANCED STORAGE OF FILE CHANGES

TECHNICAL FIELD

The present disclosure generally relates to data file differencing mechanisms.

BACKGROUND

There are various reasons for logging writes made to a data file on a storage medium. One of those reasons is write monitor differencing. Write monitor differencing is a method for synchronizing and backing up data by making changes to a previous backup based on writes to the storage medium since the previous backup. As only the writes since the previous backup are required to perform a new backup, backup time is reduced.

Typically, write difference monitor log files are arranged as a series of write entries according to the respective time of each write. This serial arrangement introduces a number of issues. For example, if there are multiple writes to the same location then all but the latest write record to that location in the log file becomes redundant. Sorting out the previous write records from the log file can be problematic. Additionally, the log file can potentially become very large as the time between backups increases and that further compounds the aforementioned previous writes to the same location issue. A large log file size will also typically increase the time required to perform a backup since write monitor differencing is a sequential backup methodology.

SUMMARY

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

The claimed embodiments provide methods, apparatuses and systems directed to storing write records in a hierarchical index which includes a root node with one or more stem nodes, each corresponding to respective data ranges of a data file. Write records are attached to the hierarchical index as leaf nodes with a possibility of being split into two or more leaf nodes if a write record traverses multiple data ranges. Additionally, the hierarchical index can conditionally grow based on a number of leaf nodes attached to a given stem node in the hierarchical index.

In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Figure 1:
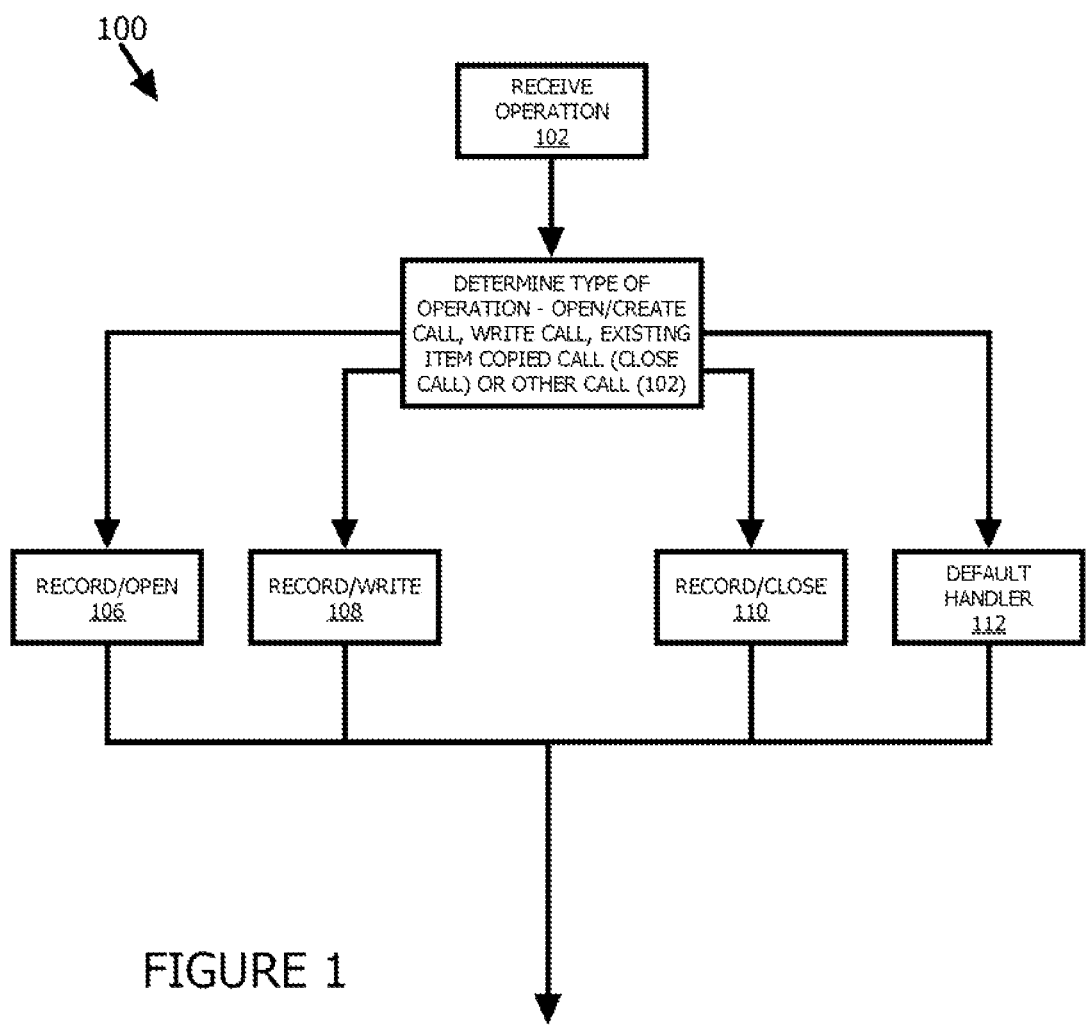
FIG. 1 is a flowchart diagram illustrating an example monitor process used in conjunction with the claimed embodiments.

FIG. 1 is a flowchart diagram illustrating an example monitor process 100 used in conjunction with the claimed embodiments. Monitor process 100 can be executed, for example, by processor 403 of hardware system 401 (see FIG. 10). The monitor process 100, for example, may be executed on a computing system to monitor and record data relating to accesses to data files by various client applications. For example, the monitor process 100 can be incorporated into a data synchronization and backup utility, such as iShared Mobiliti® offered by Packeteer, Inc. of Cupertino, Calif. For example, the processes described herein can be used to record writes of various client applications executing on hardware system 401 to files stored on a local mass storage device (such as a hard drive), while the hardware system 401 is not connected to a network that allows access to a data store containing an underlying or backup file. When the hardware system 401 is again connected to a network, a user may perform an incremental backup of one or more selected files, causing the log of write information discussed below to be applied to the backup or underlying data file on a remote data store. Processor 403 and hardware system 401 will be described in a subsequent section.

In the implementation shown, monitor process 100 involves the processor 403 receiving an operation, determining a type of the received operation and recording the occurrence of the received operation. Specifically, the processor 403 determines, for monitor process 100, the following types of operations: open/create calls, write calls and existing item copied (close) calls. Any received operation that is not one of the three (open, write or close) is designated as generic or other.

Monitor process 100 begins with the processor 403 receiving an operation (102) and determining a type of the received operation (104). Next, the processor 403 records the occurrence of the received operation based on the type of the received operation (106 or 108 or 110 or 112). The claimed embodiments will describe how write operations are recorded (108).

The claimed embodiments store write records or pointers to write records in a hierarchical index which includes a root node with one or more stem nodes corresponding to respective data ranges of a data file. Write records are attached to the hierarchical index as leaf nodes with a possibility of being split into two or more leaf nodes if the data range of a write record traverses the respective data ranges of the stem nodes. Additionally, the hierarchical index can conditionally grow based on a number of leaf nodes attached to a given stem node in the hierarchical index. In one implementation, data associated with write records is embedded with the leaf nodes. In another implementation, data is not embedded with the leaf nodes and the leaf nodes contain pointers directed to the stored data. In yet another implementation, data is not stored. At a time for backup, data from a source file corresponding to the data range described by a leaf node is read by a synchronizer and applied.

Figure 10:
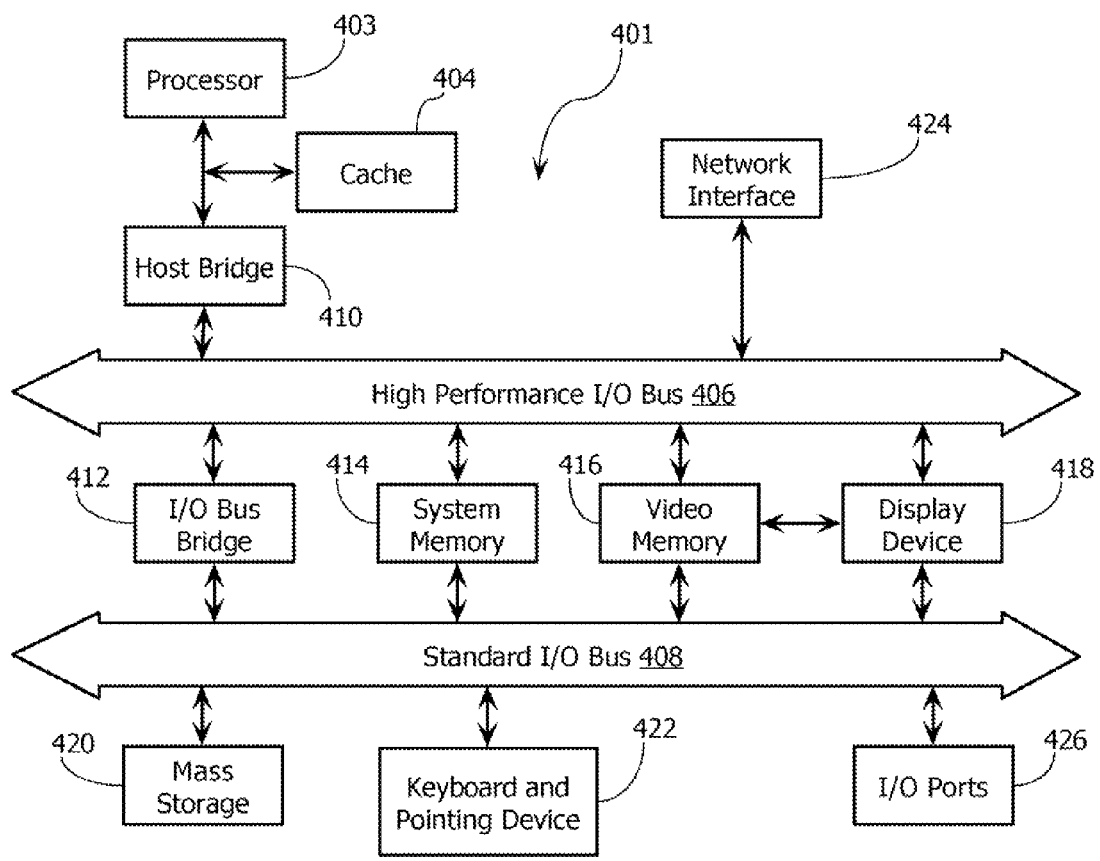
FIG. 10 is a schematic diagram illustrating an example computing system architecture that may be used to implement one or more of client systems.

The hierarchical index is saved in a persistent storage, such as mass storage 420 of FIG. 10, in between boot sessions. Therefore, the hierarchical index is constructed from the persistent storage at file open time and written to the persistent storage at the file close time. To always keep the copy of the hierarchical index in the persistent storage consistent with a memory-based hierarchical index, memory map files can be utilized which are stored in persistent memory. Any inconsistencies between the memory-based hierarchical index and the copy in the persistent storage is perhaps indicative of potential errors in the hierarchical index. When this situation occurs, the hierarchical index is not employed for backup purposes.

Inconsistencies between the memory-based hierarchical index and the copy in the persistent storage are determined by comparing time stamps of a close of a file recorded in the memory-based hierarchical index and the copy in the persistent storage. This comparison is performed when a new open of the file is recorded. If the two timestamps are equal, it is assumed that no writes occurred between the lastly-recorded file close and the new open of the file. If they do not match, then the memory-based hierarchical index and the copy in the persistent storage are perhaps not consistent.

Additionally, at the time of backup, it is verified that writes to the file have been trapped, if the file is open. If the file is closed at the time of backup, a last close in the memory-based hierarchical index is compared to a current time stamp of the file. Again, if the time stamps do not match, then the memory-based hierarchical index and the copy in the persistent storage are perhaps not consistent.

Figure 2A:
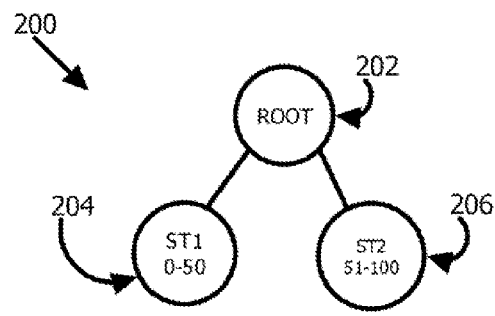
FIGS. 2A-2C illustrate a sequential example of construction of a hierarchical index, in accordance with an example embodiment.
Figure 2B:
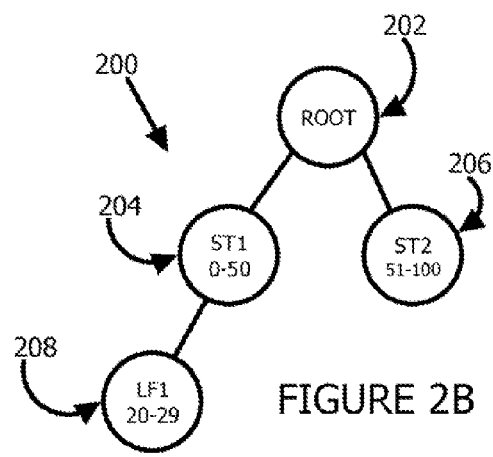
Figure 2C:
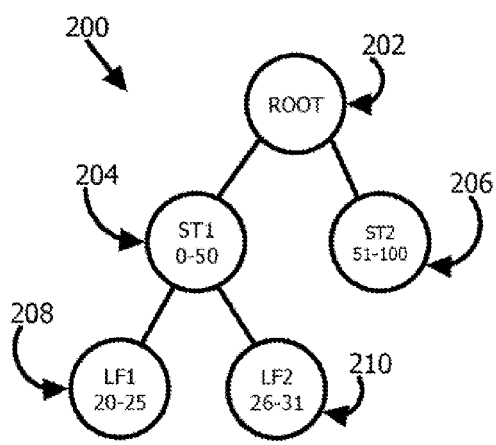

An example of a hierarchical index and how write records are added is shown in FIGS. 2A-2C. Referring to FIG. 2A, hierarchical index 200 includes a root 202, and stem nodes 204, 206 which, at initialization, do not yet have any leaf nodes attached to them. When a hierarchical index is initially created, offset locations of a corresponding storage medium will typically be split up into data ranges and each data range will have a corresponding stem node. In the example of FIG. 2A, there are two stem nodes 204, 206. In one implementation, the data ranges of these stem nodes can depend on the file size of the data file. For example, if the data file is currently N bytes, the data range of stem node 204 can be the starting address (e.g., 0) to N div 2, where "div" returns the integer portion of the division of N by 2. In addition, the data range of stem node 206 can span from (N div 2)+1 to N. Other implementations are also possible. For example, the data range of a given first level stem node, such as stem node 204 and 206, can be limited to a maximum (such as 2 kBytes). In this scheme, therefore, the size of the data file determines the number of first level stem nodes. As discussed in more detail below, the data ranges of the stem nodes define how write records (identifying a data range typically be offset and length) are indexed in the write log for a given data file.

For didactic purposes, assume an arbitrary file size of 100 Bytes for the example implementations described below. Referring to FIG. 2B, a write record can be logically attached the hierarchical index 200 as a leaf node 208 to stem node 204. In the implementation shown, the associated write record of leaf node 208 begins at offset #20 and has a length of 10. Therefore, the associated write record is attached as leaf node 208 to stem node 204 as the data range of stem node 204 encompasses addresses 20-29.

The hierarchical index 200 of FIG. 2C includes yet another write record attached as leaf node 210. The write record of leaf node 210 begins at offset #26 and has a length of 6, and thus overlaps the data range of the previously stored write record corresponding to leaf node 208. As this later write record of leaf node 210, overlaps onto a portion of the write record that is attached as leaf node 208 in FIG. 2B, the overlapping section (#26-29) is removed from leaf node 208 as shown in FIG. 2C. This can be accomplished by deleting from the previous write record the data corresponding to the overlap, and editing the data range of the leaf node 208. As can be seen, only a latest-written write record of an offset is maintained by hierarchical index 200.

Figure 3A:
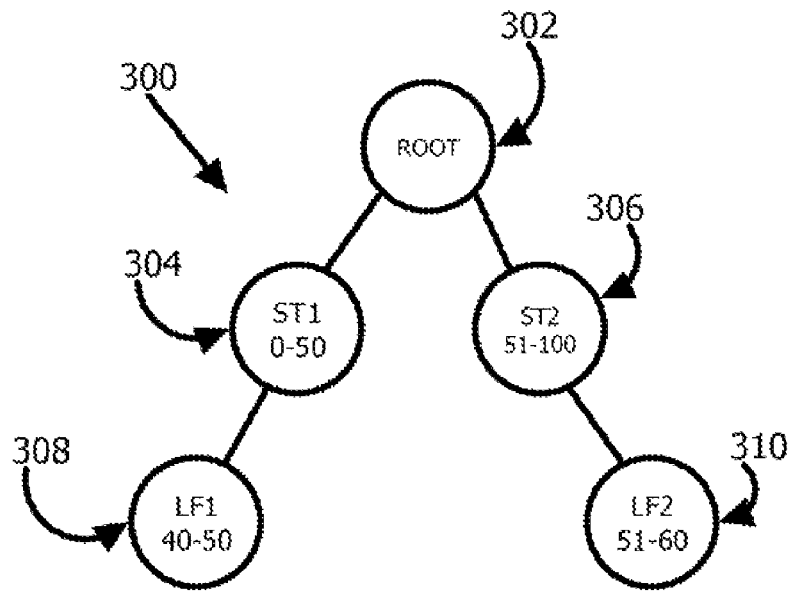
FIGS. 3A-3B illustrate examples of how a write record is split over multiple stem nodes, in accordance with an example embodiment.

Attaching the leaf nodes can be affected by a few situations. If a write record traverses the data range boundaries of more than two stem nodes then the write record is essentially split into a plurality of entries, where part of the write record addressed by one stem node is attached as a leaf node to that stem node and the remaining part of the write record addressed by the other leaf node is attached to that other stem node. An example of this can be found in FIG. 3A which shows a hierarchical index 300. Similar to hierarchical index 200, stem node 304 is assigned bytes 0-50 and stem node 306 is assigned bytes 51-100. One write record is attached to stem nodes 304 and 306 as leaf nodes 308 and 310. This write record begins at offset #40 and has a length of 20. Since stem nodes 304 and 306 are split at offset 50/51, the write record is therefore split at the same boundary.

Figure 3B:
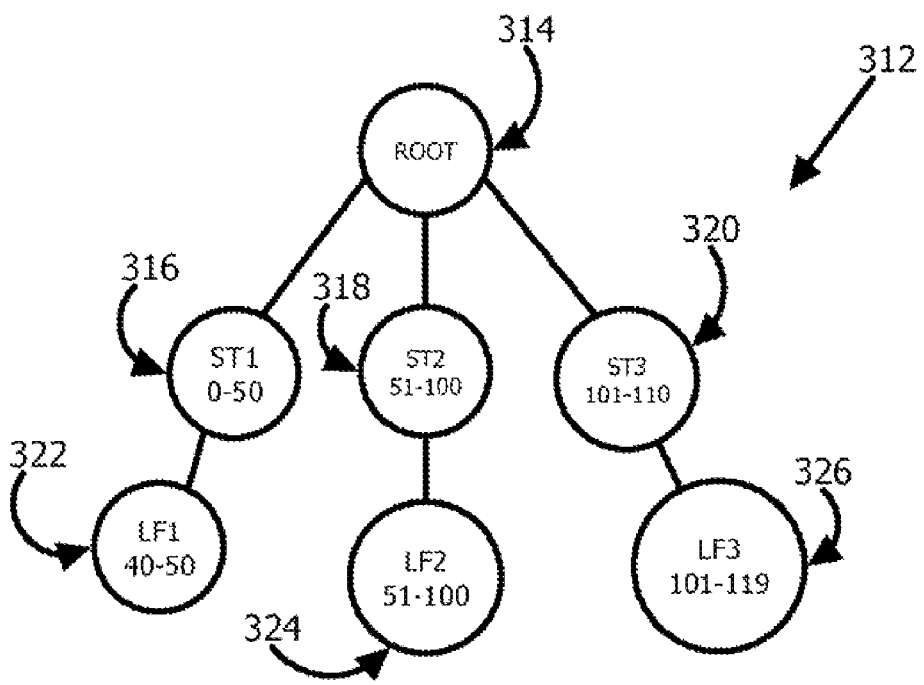

FIG. 3B shows another example of how a data record can be split across multiple stem nodes. Hierarchical index 312 includes stem nodes 316, 318 and 320 and their assigned data ranges are 0-50, 51-100 and 101-150, respectively. Attached to the stem nodes (316, 318, 320) is a write record whose offset is 40 and has a length of 70. As this write record covers two splits in the data range (50/51 and 100/101), it is split accordingly into leaf nodes 322, 324 and 326.

In a situation where a new write record occupies a duplicate range as that of another write record previously attached as a leaf node, then the new write record overwrites the write record previously attached. In the context of a new write record that overlaps an internal duplicate range of a previously attached write record, there are a few options available. An example of a new write record that overlaps an internal duplicate range would be a new write record, to be attached to hierarchical index 312 of FIG. 3B, whose offset is #70 and has a length of 10. One option to handle this new write record would be to split leaf node 324 into three leaf nodes to cover offset ranges #51-69, #70-79 and #80-100. Another option would be to overwrite offsets #70-79 in leaf node 324 with data from the new write record.

In a situation where a new write record overlaps a portion of a previously attached write record then a portion of the previously attached write record is removed from the leaf node, as discussed above. The new write record is then attached as a new leaf node that includes offset locations of the overlap.

It should be understood that write records may not actually be stored in a log file that resembles a physical representation of the hierarchical indexes of FIGS. 2A-2C, 3A-3B and FIGS. 5A-5D. Instead, write records may be stored in a log file with an index that points to where they would be stored in a hierarchical index. Also, some typical fields for write records include the mentioned index, an identification number of the write, a write time, an offset, a length, and data of the write. It should also be understood that while the various stem nodes of FIGS. 2A-2C, 3A-3B, and FIGS. 5A-5D, display their assigned data ranges, those data ranges are included to aid in an understanding of the claimed embodiments and does not indicate that any stem node is attached as a write record to a previous stem node.

Figure 4:
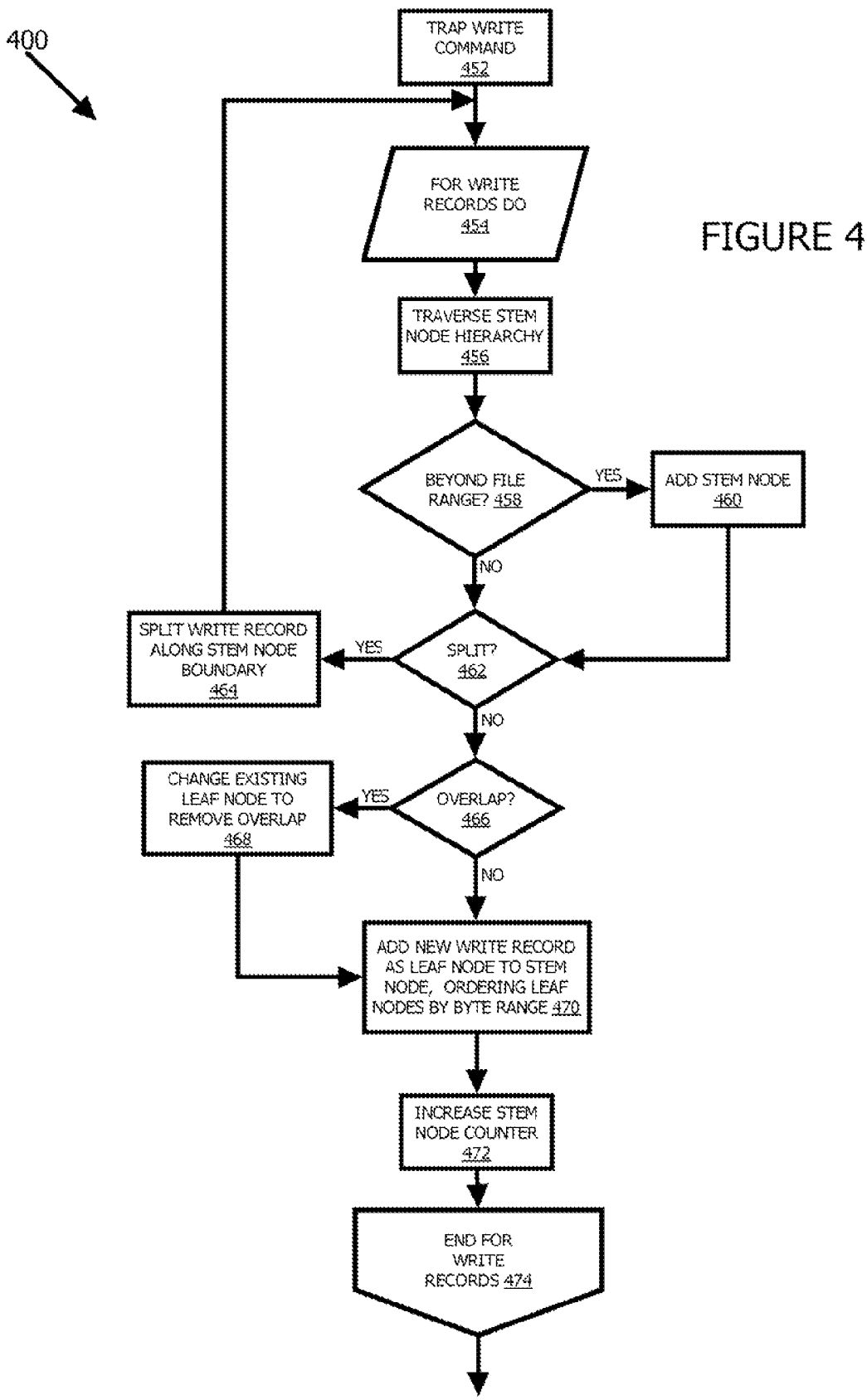
FIG. 4 is a flowchart diagram illustrating a method for growing a hierarchical index, in accordance with an example embodiment.

Adding write records to a hierarchical index is further described via method 400 of FIG. 4. Method 400 can be executed by monitor process 100 of FIG. 1 and involves trapping a write process and attaching each write record associated with the write process to a hierarchical index as a leaf node.

Method 400 begins with the monitor process 100 trapping a write command (452) and doing the following for each write record (454) associated with the write command. Initially, a given write command will spawn a single write record; however, as discussed above, more write records may be created if the data range of the write command crosses a stem node boundary. For a given write record, monitor process 100 traverses the stem node hierarchy (456) with a starting offset location corresponding to a starting offset location of the write record and determines if the write record extends beyond the range of the file, based on a starting location and a length of the write record (458). If yes, monitor process 100 adds a stem node (460) to cover any portion of the write record that extends beyond the file range.

Next, monitor process 100 decides if the write record needs to be split (462), based on the length of the write record. For example, in the didactic example discussed above, posit a write command with an offset of 45 and length 10. The monitor process 100, assuming the stem node hierarchy illustrated in FIG. 2A, would examine the data ranges of stem nodes 204 and 206 and determine that a split was necessary. In this case, monitor process 100 splits the write record along the stem node boundaries (464) and the split write records are returned for further processing by method 400. The process described above is recursive as a write record created by a split can be further split, as the monitor module 100 traverses further down the stem node hierarchy.

If a split is not required, monitor process 100 next determines if the write record overlaps a portion of a previously attached write record (466). If yes, the monitor process 100 removes the overlapping portion from the previously attached write record and the write record is attached as a new leaf node (470).

Alternatively, at operation 468, monitor process 100 overwrites the existing leaf node if the write record occupies a duplicate range as a previously attached write record. Or, as mentioned above, if the new write record occupies an internal duplicate data range of a previously attached write record then monitor process may replace the affected bits with bits from the new write record or create a new stem node to accommodate the new write record.

If operation 466 is negative then the monitor process 100 skips operation 468 and goes directly to operation 470. Monitor process 100 then increments a stem node counter (472) which correlates to a number of leaf nodes that are attached to a stem node. Monitor process 100 maintains a stem node counter for each stem node which is utilized for conditionally growing the hierarchical index which will be described in the next section. After all write records for a trapped write process have been processed by monitor process 100, method 400 completes (474).

Figure 5A:
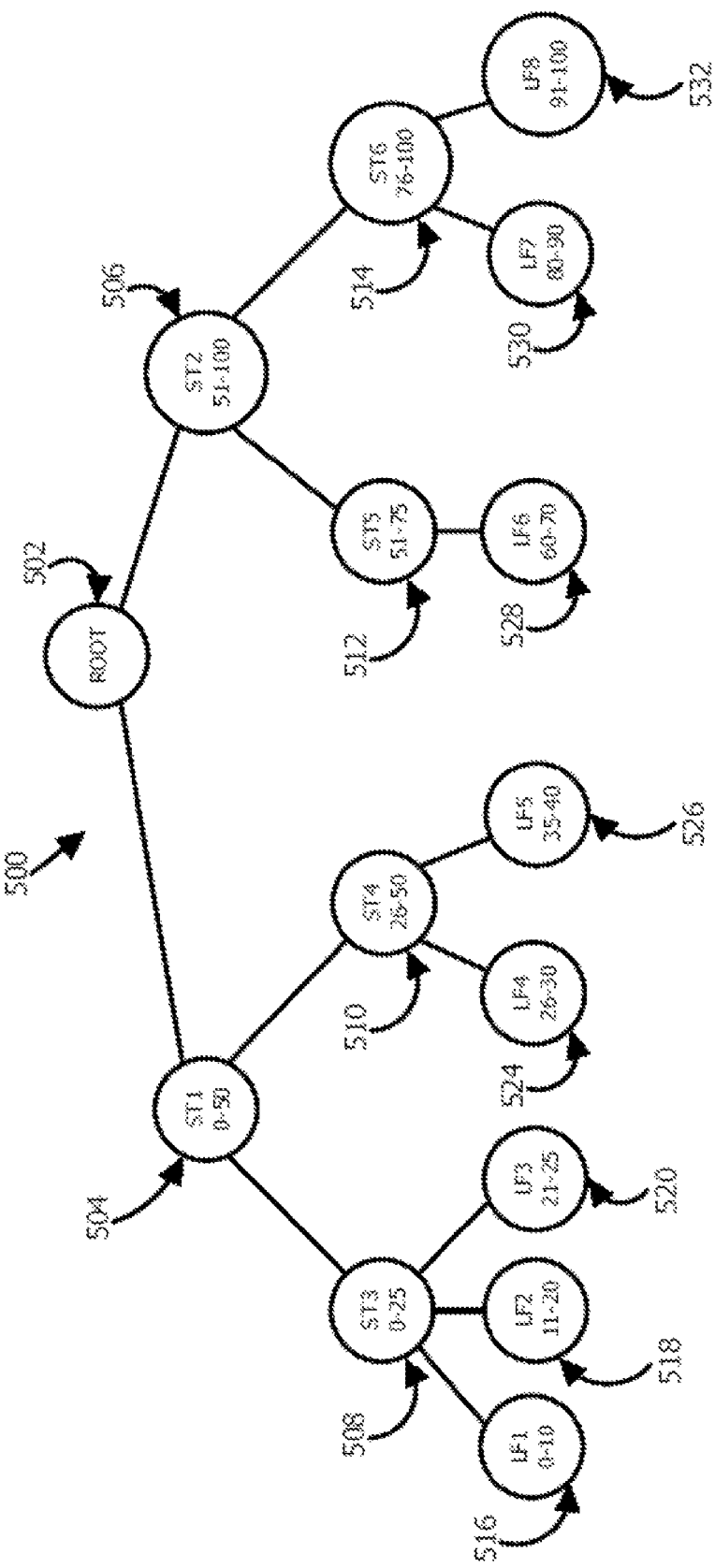
FIGS. 5A-5D illustrate examples of collapsing leaf nodes, in accordance with an example embodiment.
Figure 5B:
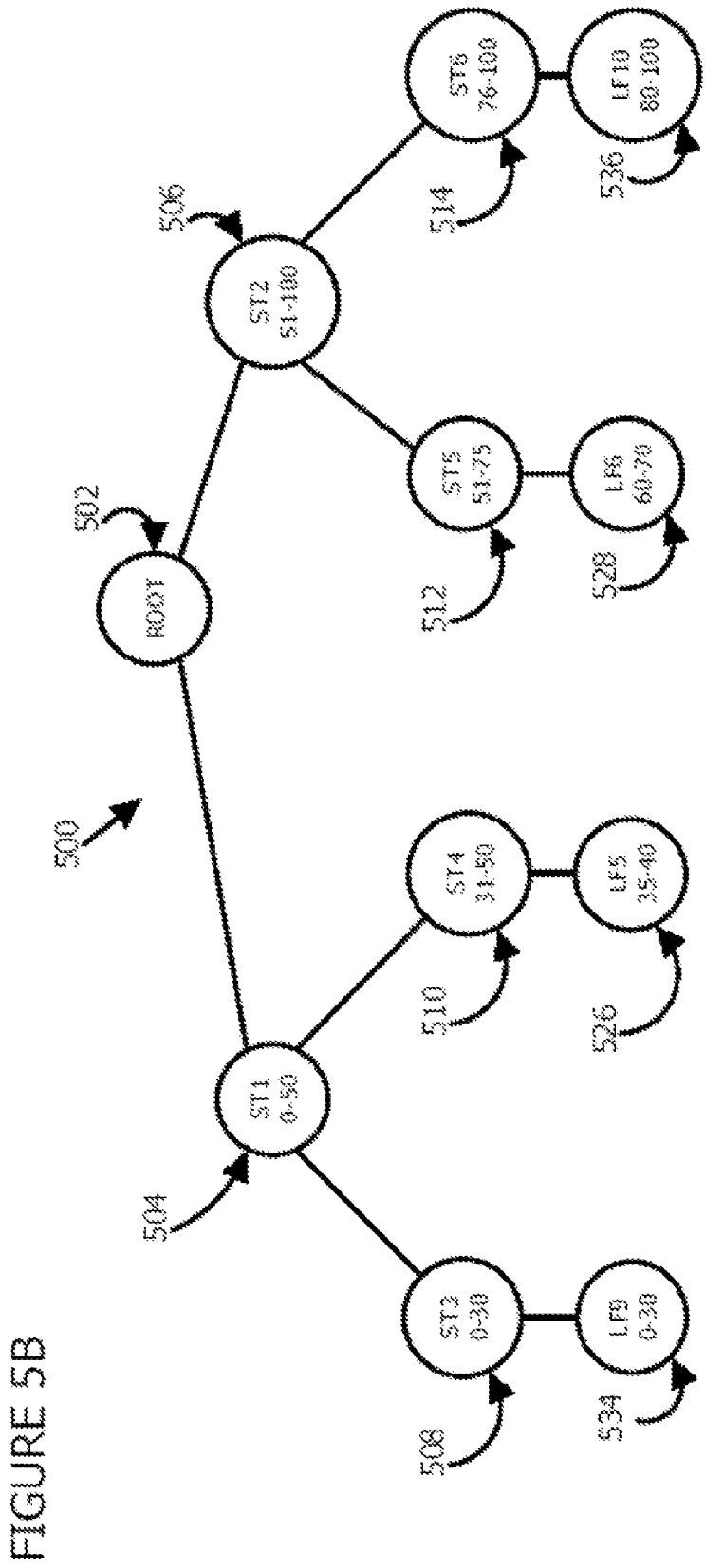

After a number of write records have been attached to a hierarchical index, it is desirable to collapse adjacent leaf nodes which occupy a contiguous data range into one leaf node. By doing so, fragmentation of a hierarchical index is minimized which results in faster traversal of the hierarchical index during a search for a write record. One example of leaf node collapsing can be found in FIGS. 5A-5B. Hierarchical index 500 of FIG. 5A includes adjacent leaf nodes 516, 518, 520 and 524 which occupies a contiguous data range of offsets #0-30. FIG. 5A also includes adjacent leaf nodes 530 and 532 which occupy offsets 80-100. Each of these two sets of leaf nodes can be collapsed into a single leaf node and the results are shown in FIG. 5B which includes leaf nodes 534 and 536. It should also be noted the data range for stem node 510 was adjusted from offsets #26-50, as shown in FIG. 5A, to offsets #31-50, as shown in FIG. 5B. This was done because leaf node 524 of FIG. 5A occupied offsets #26-30 which were collapsed into leaf node 534 of FIG. 5B.

Figure 5C:
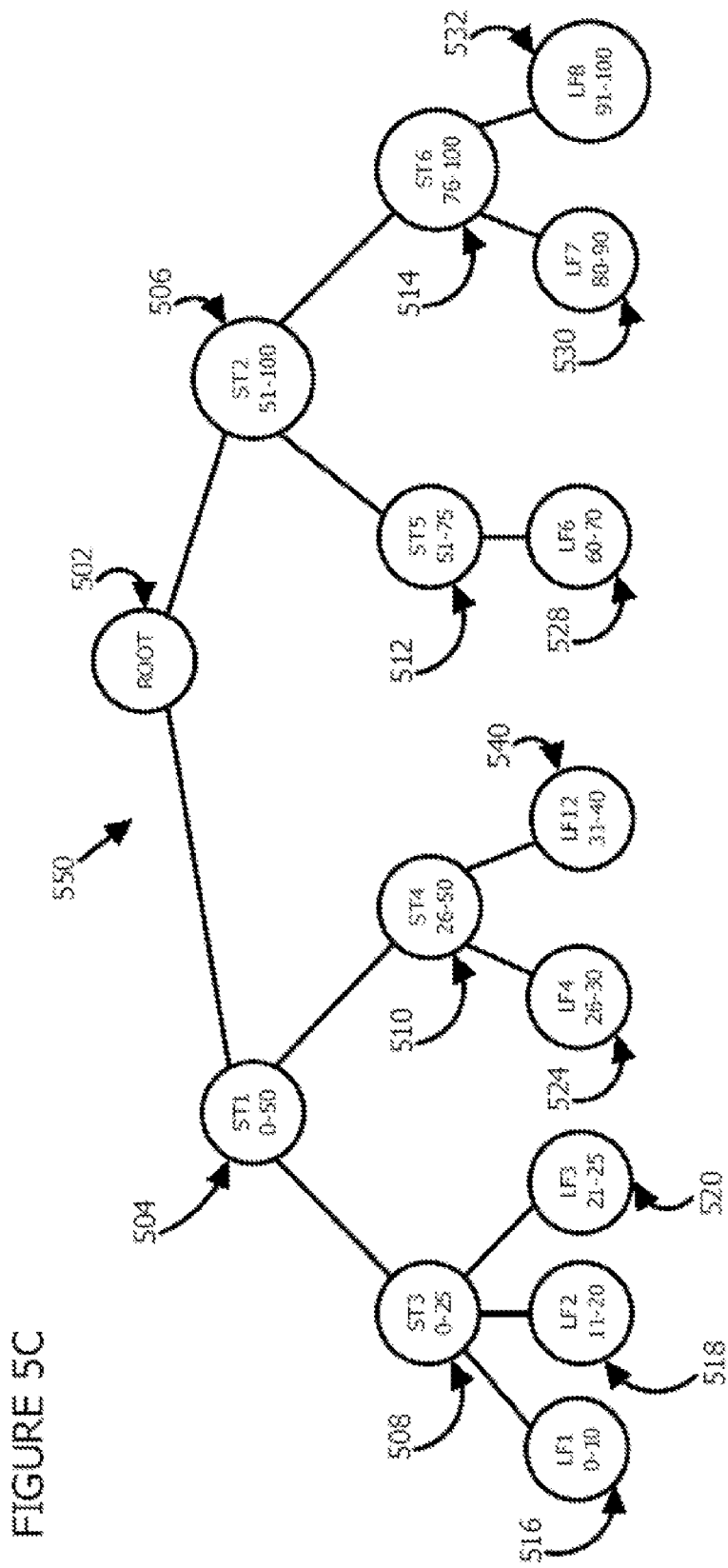
Figure 5D:
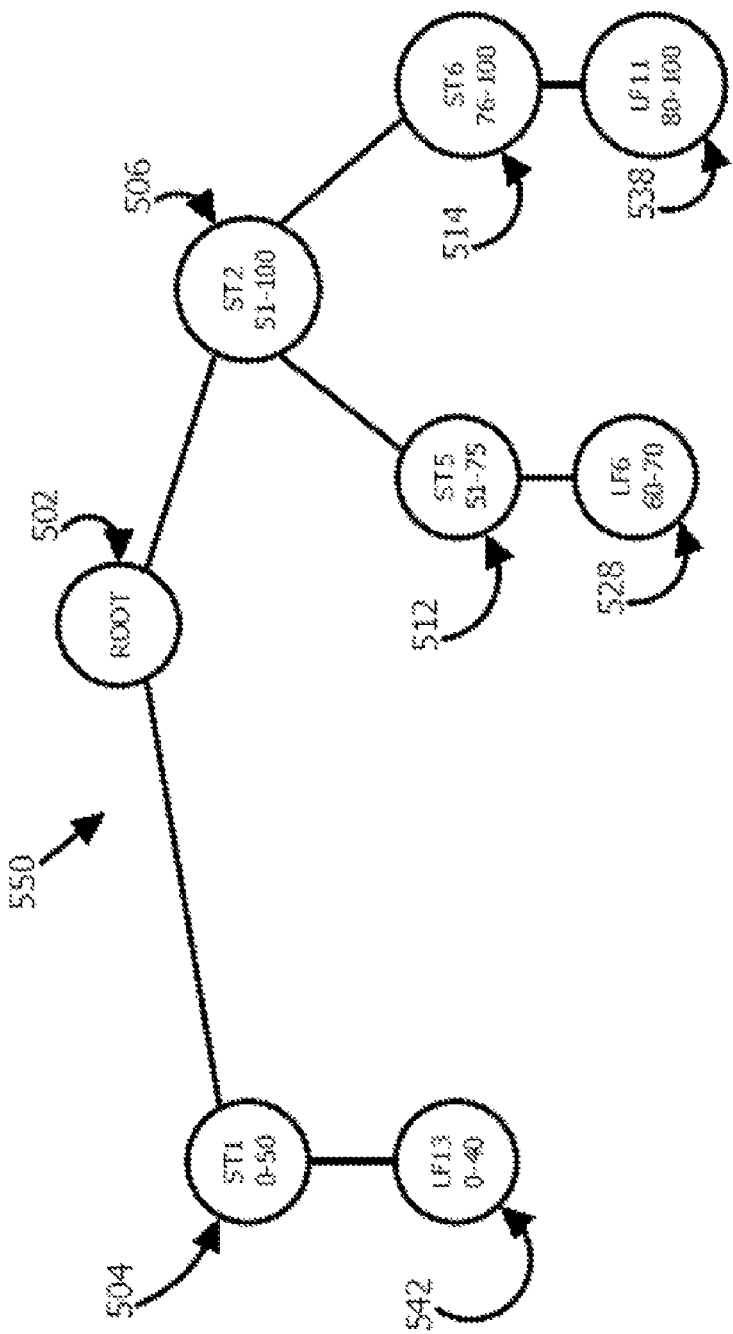

In some circumstances, collapsing of leaf nodes can also potentially affect stem nodes on a previous level and an example is shown in FIGS. 5C-5D. In the hierarchical index 550 of FIG. 5C, leaf nodes 516, 518, 520, 524 and 540 all occupy a contiguous data range of offsets #0-40 and there are no other leaf nodes attached to the involved stem nodes (508, 510). Due to this, leaf nodes 516, 518, 520, 524 and 540 can be collapsed into leaf node 542 as shown in FIG. 5D and stem nodes 508 and 510 are removed to allow leaf node 542 to be directly attached to stem node 504.

It is also desirable to check for a number of leaf nodes attached to each stem node and perhaps divide certain stem nodes into additional stem nodes, thereby growing the hierarchy, if they have more than a certain number leaf nodes. This is also done to aid in sorting through the write records to locate a specific write record. Sorting through a relatively "flat" hierarchical index tends to be less efficient as opposed to a non-flat hierarchical index. However, it may also be desirable to limit the ultimate depth of the hierarchical index as well. Referring back to FIGS. 2A-2C, for purposes of describing the claimed embodiments, the root 202 is referred to as level 1, the next level 2 includes stem nodes 204, 206 and so on. With this in mind, the depth of the hierarchical index 200 in FIG. 2A is 2, in FIG. 2B the depth of the hierarchical index 200 is 3 and the depth is 4 in FIG. 2C.

Figure 6A:
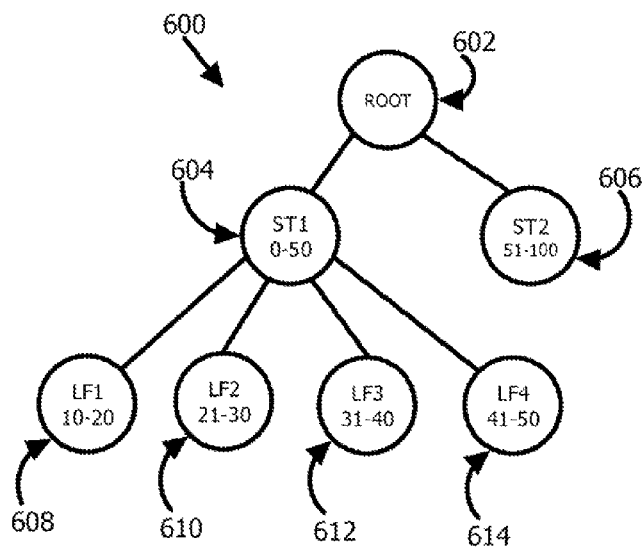
FIGS. 6A-6B illustrate an example of an expanding hierarchical index, in accordance with an example embodiment.
Figure 6B:
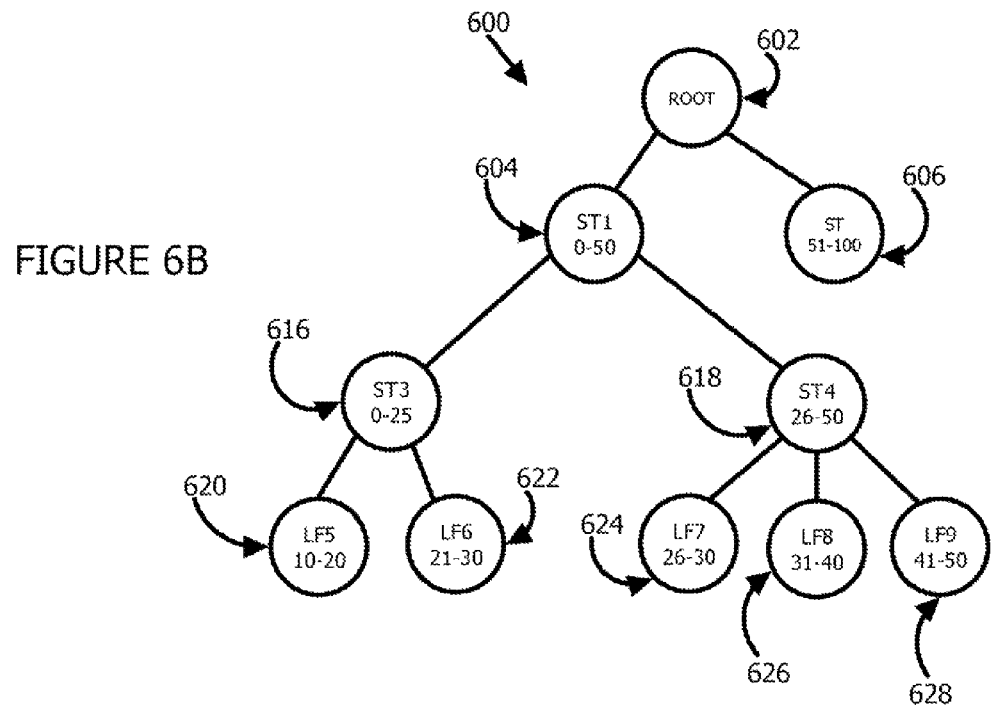

FIGS. 6A-68 illustrate an example of an expanding hierarchical index. For this example, assume that a leaf node threshold is 3. In FIG. 6A is a hierarchical index 600 whose stem node 604 with four leaf nodes (608, 610, 612, 614). Stem node 604 has a data range of 0-50, leaf node 608's is 10-20, leaf node 610's is 21-30, leaf node 612's is 31-40 and leaf node 614's is 41-50. As stem node 604 has more leaf nodes (4) than the leaf node threshold (3), stem node 604 therefore needs to be divided. To do this, stem node 604 is divided to create two new child stem nodes 616 and 618 as shown in FIG. 68. Stem node 616's data range is 0-25 and stem node 618's is 26-50. Next, leaf nodes 620 and 622 are appended to stem node 616 and leaf nodes 624, 626 and 628 are appended to stem node 618. Leaf node 624's data range is 26-30 as that data range was split off.

Figure 7:
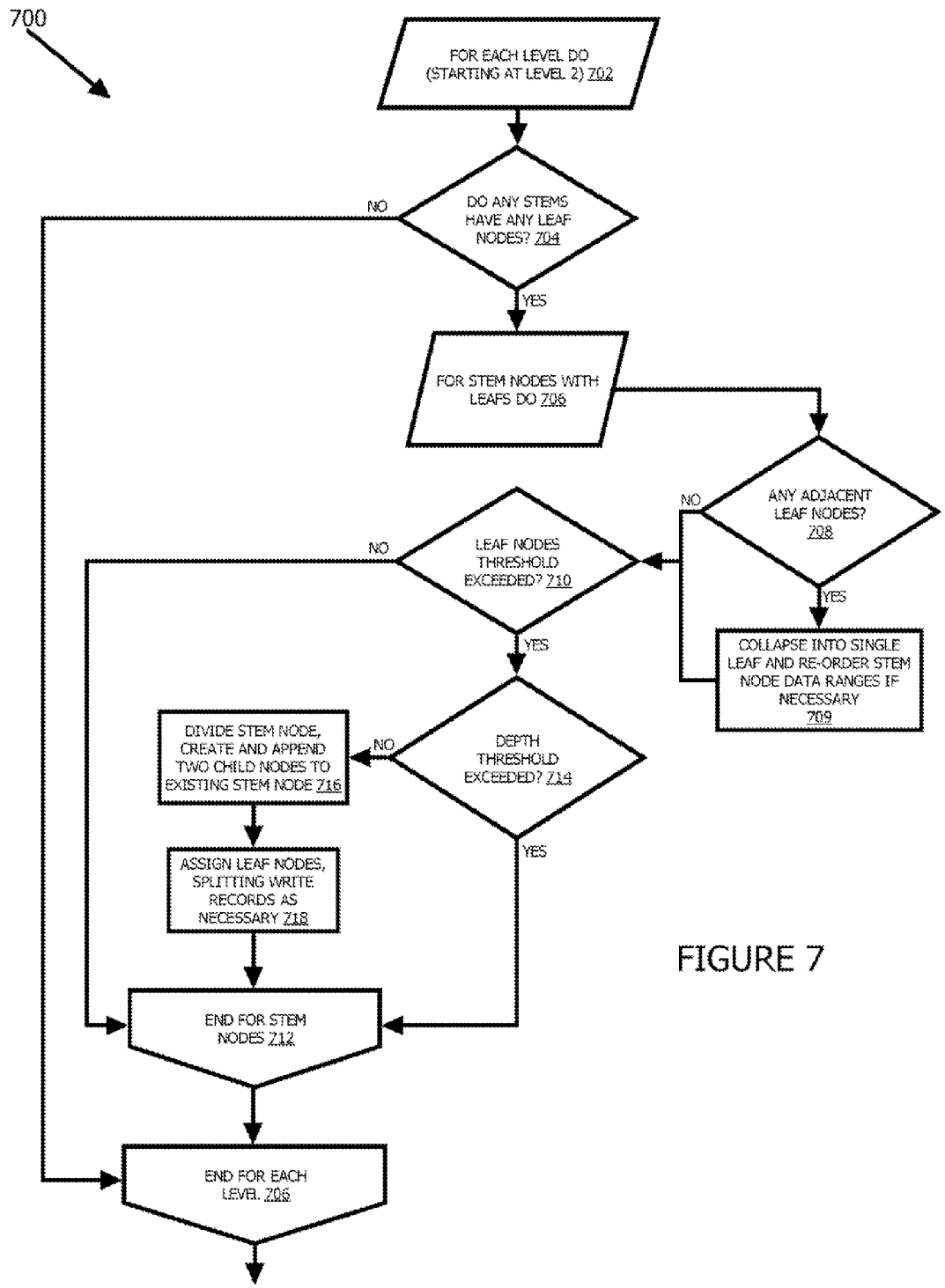
FIG. 7 is a flowchart diagram illustrating a method for dividing stem nodes of a hierarchical index, in accordance with an example embodiment.

Method 700 of FIG. 7 describes how the stem nodes are potentially divided in view of a depth of the hierarchical index, according to one possible implementation of the invention. Similar to method 400, method 700 can also be executed by monitor process 100. Starting at a second level of a hierarchical index, monitor process 100 locates all stem nodes with leaf nodes and collapses adjacent leaf nodes. Next, assuming a threshold number of leaf nodes is exceeded, monitor process 100 creates child stem nodes of the current stem node and attaches the leaf nodes to the new child stem nodes based on data ranges, as discussed above.

Method 700 starts with monitor process 100 working through levels of a hierarchical index starting at level #2 (702) by first determining if there are any stem nodes with leaf nodes (704). If there are no stem nodes with any leaf nodes on any level of the hierarchical index from level #2 on down then method 700 is complete (706). If the monitor process 100 locates stem nodes with leaf nodes (704), then monitor process 100, for each of the located stem nodes with leaf nodes, checks to see if the next leaf node is adjacent (708) in that edges of their data ranges are contiguous. If yes, the adjacent leaf node is merged into a single leaf node and parent stem node data range is re-ordered as necessary (709). In some situations, more than two leaf nodes will be collapsed. Additionally, if a stem node of the adjacent leaf nodes does not have other non-adjacent leaf nodes then the stem node can be removed such that the collapsed leaf node is attached to a "grandparent" stem node.

After operation 709 or if the result operation 708 is negative, write process 100 then checks to see if there are more than a threshold number of leaf nodes (710) and if a depth of the hierarchical index is above a threshold (714). If both are affirmative or just the result of operation 710 is negative, monitor process 100 moves on to the next located stem node with leaf nodes or perhaps to a next level to check to see if any stem nodes have leaf nodes (704) on that next level. A number of leaf nodes attached to a stem node is determined from the previously mentioned stem node counter of method 400. The method illustrated above operates on a top down basis; accordingly, child stem nodes created when the process was operating at a first level of the hierarchy may be further divided when the process proceeds to the level of the new child stem nodes.

If the results of operation 710 is affirmative and 714 is negative then monitor process 100 divides the stem node into child nodes (i.e., attach two new stem nodes to the stem node), appends two new child stem nodes to the existing stem node (716) and assigns leaf nodes to the two new child stem nodes, splitting write records as necessary (718). Monitor process 100 then moves on to the next located stem node with leaf nodes, goes to the next level if there are no more stem nodes with leaf nodes or finishes (712, 706) method 700 if there are no more levels to cycle through. The data ranges of the two new child stem nodes can simply be equal or near equal divisions of the data range of the parent stem node.

In one implementation, method 700 is performed after every N writes. In another implementation, method 700 is repeated on a time-based (e.g., every day, every hour, etc.) schedule. In yet another implementation, method 700 is performed when a corresponding file is closed.

Figure 8:
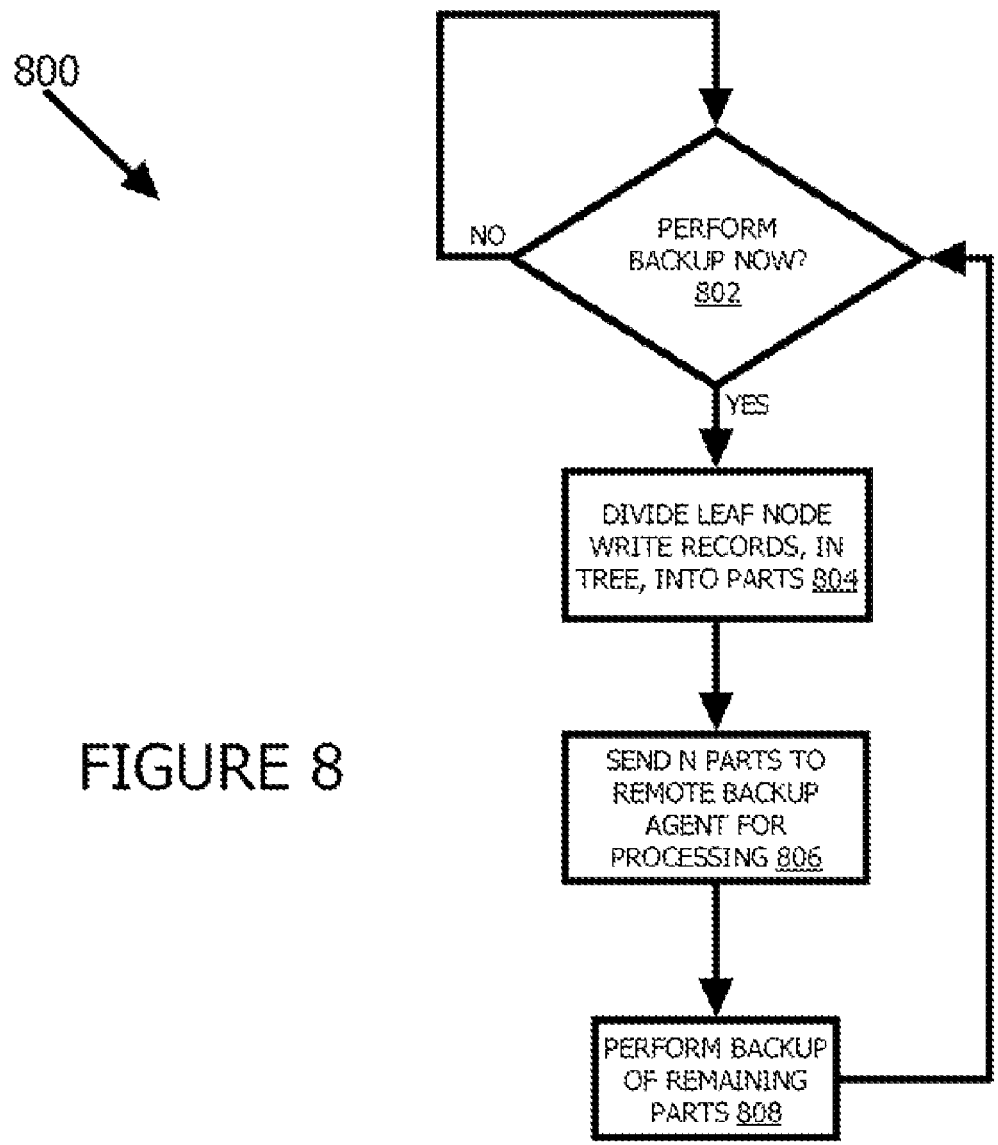
FIG. 8 is a flowchart diagram illustrating a method for backing up data based on a hierarchical index, in accordance with an example embodiment.
Figure 9:
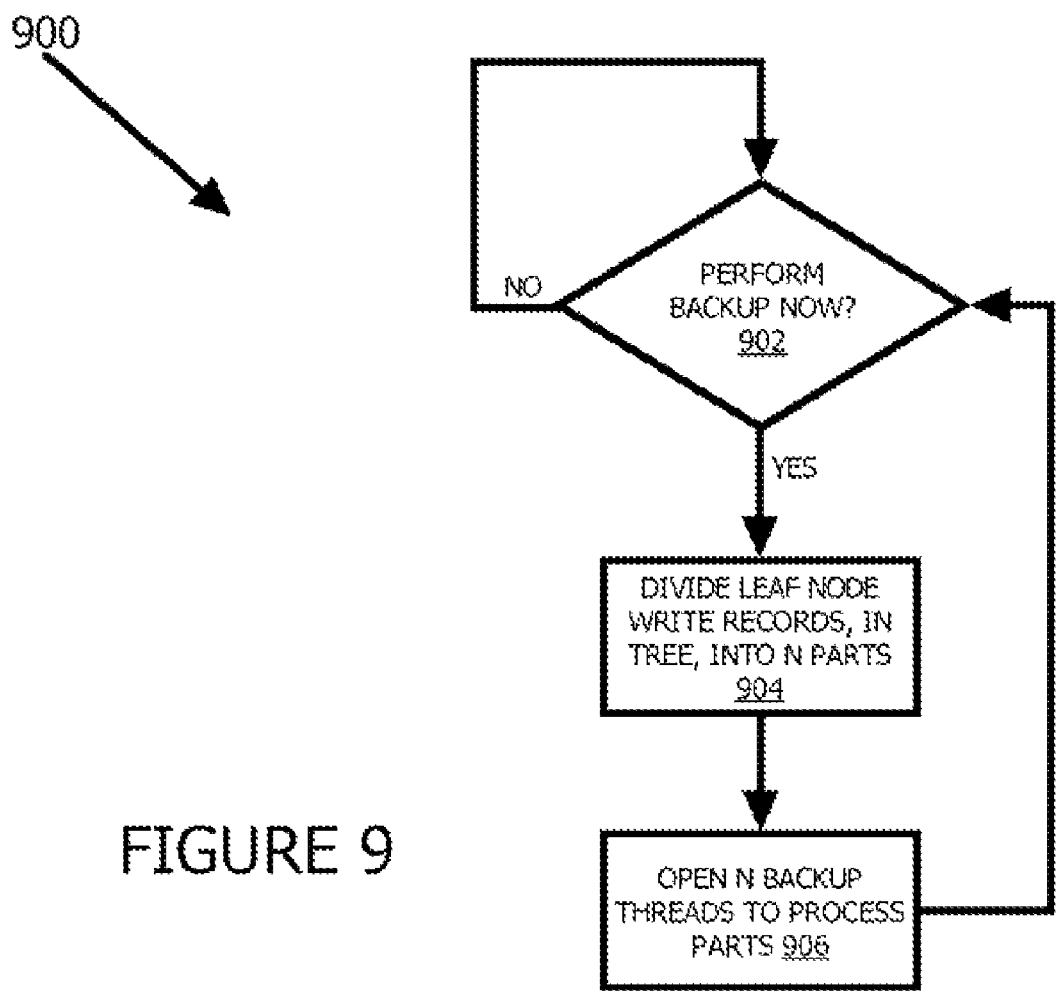
FIG. 9 is a flowchart diagram illustrating another method for backing up data based on a hierarchical index, in accordance with an example embodiment.

When a backup of a storage medium is desired, the hierarchical index advantageously provides various options for performing the backup. Firstly, as the hierarchical index only contains the latest write records to apply to a backup storage medium no sorting of the write records is required to determine which write records are the latest-written write records. Due to this, the write records can be utilized in any desired order, implemented simultaneously and combinations thereof. With that in mind, FIGS. 8-9 illustrate two methods 800 and 900 for backing up a storage medium utilizing the hierarchical index and can be executed by monitor process 100.

For method 800, monitor process 100 divides write records into parts, sends a portion of the parts to a remote backup agent to perform backup operations on those sent parts and monitor process 100 performs backup operations on the remaining parts. Starting at operation 802, monitor process 100 determines if it is now time to perform the backup. If yes, monitor process 100 divides the leaf node write records into parts (804) and sends N parts to a remote agent backup agent for processing (806). Next monitor process 100 performs backup operations on the remaining parts (808).

For method 900, monitor process 100 divides the leaf node write records into N parts and then performs backup operations of the N parts simultaneously. Starting at operation 902, monitor process 100 determines if it is now time to perform the backup. If yes, monitor process 100 divides the leaf node write records into parts (804) and opens up N backup threads to process the parts (906).

While the methods of the claimed embodiments have been described above with reference to specific embodiments, some or all of the elements or operations thereof may be implemented using a computer system having a general purpose hardware architecture. FIG. 10 illustrates an example hardware system 401, which may be used to implement a client node. In one embodiment, hardware system 401 includes a processor 403 and a cache memory 404 coupled to each other as shown. Additionally, hardware system 401 includes a high performance input/output (I/O) bus 406 and a standard I/O bus 408. A host bridge 410 couples processor 403 to high performance I/O bus 406, whereas an I/O bus bridge 412 couples the two buses 406 and 408 to each other. Hardware system 401 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 401 are described below. In particular, network interface 424 provides communication between hardware system 401 and any of a wide range of wireline (e.g., Ethernet, etc.) or wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 403. I/O ports 426 are one or more serial and/or parallel communication ports that provide communication between additional peripheral devices, which may couple to hardware system 401.

Hardware system 401 may include a variety of system architectures; and various components of hardware system 401 may be rearranged. For example, cache 404 may be on-chip with processor 403. Alternatively, cache 404 and processor 402 may be packed together as a "processor module," with processor 403 being referred to as the "processor core." Furthermore, certain embodiments of the present invention may not require nor include all of the above components. For example, the peripheral devices shown coupled to standard I/O bus 408 may couple to high performance I/O bus 406. In addition, in some embodiments only a single bus may exist, with the components of hardware system 401 being coupled to the single bus. Furthermore, hardware system 401 may include additional components, such as additional processors, storage devices, or memories.

In one embodiment, the operations of client-side functionality are implemented as a series of software routines run by hardware system 401. These software routines may comprise a plurality or series of instructions to be executed by a processor in a hardware system, such as processor 403. Initially, the series of instructions may be stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 403. In some implementations, one or more aspects of the instructions may be implemented in hardware or firmware.

While FIG. 10 illustrates, for didactic purposes, the hardware architecture of a client according to an aspect of the claimed embodiments, the client may, however, be implemented on a wide variety of computer system architectures, such as special purpose, hand held or portable devices, Personal Digital Assistants (e.g., converged devices which support MAN data∝voice), Laptop computers, hand-held phones, and the like. Still further, embodiments of the invention can operate in connection with other wireline hosts system, such as a desktop-based IP phone, and a laptop or desktop computer with an Ethernet Network Interface Controller (NIC).

An operating system manages and controls the operation of hardware system 401, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP/Vista operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

While the claimed embodiments and their various functional components have been described in particular embodiments, it should be appreciated that the claimed embodiments can be implemented in hardware, software, firmware, middleware or a combination thereof and utilized in systems, subsystems, components or sub-components thereof. When implemented in software, the elements of the claimed embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g., a processor, a computer, etc.).

Additionally, while a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for storing write records in a hierarchical index comprising:
   maintaining a hierarchical index in a computer-readable memory, wherein the hierarchical index comprises a root node and one or more stem nodes corresponding to respective data location ranges of a data file;
   accessing a write command identifying a data location range of the data file;
   adding, responsive to the write command, one or more write records for the write command as one or more respective leaf nodes to the hierarchical index maintained in the computer-readable memory, wherein each leaf node is attached to a stem node whose data location range encompasses the data location range of the write command; and
   conditionally growing the hierarchical index based on a number of leaf nodes attached to a given stem node in the hierarchical index.

2. The method as recited in claim 1 further comprising collapsing adjacent leaf nodes which occupy a contiguous data location range into a single leaf node.

3. The method as recited in claim 2 wherein the collapsing step is performed before the growing step.

4. The method as recited in claim 2 wherein a parent stem node of the single leaf node is removed and the single leaf node is hung from a grandparent stem node if the parent stem node has no other leaf nodes which are non-contiguous to the single leaf node.

5. The method as recited in claim 1 wherein the adding step comprises:
   creating a first write record responsive to the write command; and
   splitting the first write record into second and third write records if the data range of the write command traverses the data location ranges of at least two stem nodes in the hierarchical index.

6. The method as recited in claim 1 wherein if a data location range of an attached write record duplicates a data location range of a new write record to be attached to the stem node then the new write record overwrites the attached write record.

7. The method as recited in claim 1 wherein if a portion of a data location range of an attached write record duplicates a data location range of a new write record then the portion is overwritten by the new write record as a new leaf node wherein a remaining portion of the data range of the attached write record remains attached to the leaf node.

8. The method as recited in claim 1 wherein conditionally growing the hierarchical index comprises:
   for each stem node with leaf nodes below a first level of the hierarchical index:
      determining if a number of leaf nodes is greater than a leaf node threshold;
      if the number of leaf nodes is greater than the leaf node threshold then:
         dividing the stem node into two stem nodes;
         adding leaf nodes to each of the two stem nodes; and
         splitting write records, if required.

9. The method as recited in claim 8 further comprising determining if a depth of the hierarchical index is greater than a depth threshold wherein dividing the stem node, adding leaf nodes and splitting the write records, if required, are additionally based on the depth being less than the depth threshold.

10. The method as recited in claim 8 wherein the number of leaf nodes attached to a stem node is determined from a stem node counter which increments as each leaf node is attached to the stem node.

11. The method as recited in claim 1 wherein the hierarchical index is conditionally grown after every N write records are attached.

12. The method as recited in claim 1 wherein the hierarchical index is conditionally grown according to a time-based schedule.

13. The method as recited in claim 1 wherein the hierarchical index is conditionally grown when a corresponding file is closed.

14. The method as recited in claim 1 further comprising performing a backup of the data file utilizing the hierarchical index.

15. The method as recited in claim 14 wherein performing the backup of the data file comprises:
dividing leaf node write records of the hierarchical index into parts;
sending a portion of the parts to a remote backup agent which performs part of the backup based on the portion of the parts; and
performing a balance of the backup with the remaining parts.

16. The method as recited in claim 14 wherein performing the backup of the file comprises:
dividing leaf node write records of the hierarchical index into N parts; and
opening N backup threads to process the parts.

17. The method of claim 1 wherein the data location range identified in the write command is expressed as a byte offset in the data file and a byte length.

18. An apparatus for storing write records in a hierarchical index comprising:
one or more processors;
one or more network interfaces;
a memory;
a software application, physically stored in the memory, comprising instructions operable to cause the one or more processors and the apparatus to:
define a hierarchical index comprising a root node and one or more stem nodes corresponding to respective data location ranges of a data file;
access a write command identifying a data location range of the data file;
add, responsive to the write command, one or more write records for
the write command as one or more respective leaf nodes to the hierarchical index, wherein each leaf node is attached to a stem node whose data location range encompasses the data location range of the write command; and
conditionally grow the hierarchical index based on a number of leaf nodes attached to a given stem node in the hierarchical index.

19. The apparatus as recited in claim 18 wherein the software application further comprises instructions operative to cause the processor to collapse adjacent leaf nodes which occupy a contiguous data location range into a single leaf node.

20. The apparatus as recited in claim 19 wherein to collapse the adjacent leaf nodes is performed before conditionally grow the hierarchical index.

21. The apparatus as recited in claim 19 wherein a parent stem node of the single leaf node is removed and the single leaf node is hung from a grandparent stem node if the parent stem node has no other leaf nodes which are non-contiguous to the single leaf node.

22. The apparatus as recited in claim 19 wherein to add one or more write records, the software application further comprises instructions operative to cause the processor to:
create a first write record responsive to the write command; and
split the first write record into second and third write records if the data location range of the write command traverses the data location ranges of at least two stem nodes in the hierarchical index.

23. The apparatus as recited in claim 18 wherein if a data location range of an attached write record duplicates a data location range of a new write record to be attached to the stem node then the new write record overwrites the attached write record.

24. The apparatus as recited in claim 18 wherein if a portion of a data location range of an attached write record duplicates a data location range of a new write record then the portion is overwritten by the new write record as a new leaf node wherein a remaining portion of the data location range of the attached write record remains attached leaf node.

25. The apparatus as recited in claim 18 wherein to conditionally grow the hierarchical index, the software application further comprises instructions operative to cause the processor to:
for each stem node with leaf nodes below a first level of the hierarchical index:
determine if a number of leaf nodes is greater than a leaf node threshold;
determine if a depth of the hierarchical index is greater than a depth threshold;
if the number of leaf nodes is greater than the leaf node threshold then:
divide the stem node into two stem nodes;
add leaf nodes to each of the two stem nodes; and
split write records, if required.

26. The apparatus as recited in claim 25 wherein the software application further comprises instructions operative to cause the processor to determine if a depth of the hierarchical index is greater than a depth threshold wherein to divide the stem, add leaf nodes and split write records, if required, is additionally based on the depth being less than the depth threshold.

27. The apparatus as recited in claim 25 wherein the number of leaf nodes attached to a stem node is determined from a stem node counter which increments as each leaf node is attached to the stem node.

28. The apparatus as recited in claim 18 wherein the hierarchical index is conditionally grown after every N write records are attached.

29. The apparatus as recited in claim 18 wherein the hierarchical index is conditionally grown according to a time-based schedule.

30. The apparatus as recited in claim 18 wherein the hierarchical index is conditionally grown when a corresponding file is closed.

31. The apparatus as recited in claim 18 wherein the software application further comprises instructions operative to cause the processor to perform a backup of the file utilizing the hierarchical index.

32. The apparatus as recited in claim 31 wherein to perform the backup of the file, the software application further comprises instructions operative to cause the processor to:
- divide leaf node write records of the hierarchical index into parts;
- send a portion of the parts to a remote backup agent which performs part of the backup based on the portion of the parts; and
- perform a balance of the backup with the remaining parts.

33. The apparatus as recited in claim 31 wherein to perform the backup of the file, the software application further comprises instructions operative to cause the processor to:
- divide leaf node write records of the hierarchical index into N parts; and
- open N backup threads to process the parts.

34. The apparatus of claim 18 wherein the data location range identified in the write command is expressed as a byte offset in the data file and a byte length.

35. A computer-readable storage medium comprising computer-readable instructions operable to cause one or more processors to:
- define a hierarchical index comprising a root node and one or more stem nodes corresponding to respective data location ranges of a data file;
- access a write command identifying a data location range of the data file;
- add, responsive to the write command, one or more write records for the write command as one or more respective leaf nodes to the hierarchical index, wherein each leaf node is attached to a stem node whose data location range encompasses the data range of the write command; and
- conditionally grow the hierarchical index based on a number of leaf nodes attached to a given stem node in the hierarchical index.

36. The computer-readable storage medium of claim 35 wherein the data location range identified in the write command is expressed as a byte offset in the data file and a byte length.

* * * * *